(12) United States Patent
Pica et al.

(10) Patent No.: US 9,167,495 B2
(45) Date of Patent: Oct. 20, 2015

(54) CELL SELECTION

(75) Inventors: Francesco Pica, San Diego, CA (US);
Andrea Garavaglia, Nuremberg (DE);
Long Duan, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 1196 days.

(21) Appl. No.: 12/138,056

(22) Filed: Jun. 12, 2008

(65) Prior Publication Data

US 2008/0311900 A1    Dec. 18, 2008

Related U.S. Application Data

(60) Provisional application No. 60/944,472, filed on Jun. 15, 2007.

(51) Int. Cl.
*H04W 24/00* (2009.01)
*H04W 36/30* (2009.01)

(52) U.S. Cl.
CPC ................. *H04W 36/30* (2013.01)

(58) Field of Classification Search
CPC ................ H04W 24/08; H04W 24/00
USPC ..................... 455/423, 436, 435.2
See application file for complete search history.

(56) References Cited

U.S. PATENT DOCUMENTS

| | | | |
|---|---|---|---|
| 5,513,246 A * | 4/1996 | Jonsson et al. | 455/443 |
| 5,926,759 A | 7/1999 | Severwright | |
| 6,041,235 A * | 3/2000 | Aalto | 455/437 |
| 7,515,928 B2 * | 4/2009 | Kang | 455/525 |
| 2004/0246922 A1 * | 12/2004 | Ruan et al. | 370/331 |
| 2005/0213687 A1 * | 9/2005 | Matsui et al. | 375/316 |
| 2006/0187873 A1 | 8/2006 | Friday et al. | |
| 2006/0258350 A1 * | 11/2006 | Roy et al. | 455/435.1 |

FOREIGN PATENT DOCUMENTS

| | | |
|---|---|---|
| EP | 1467586 A2 | 10/2004 |
| JP | 9135204 A | 5/1997 |
| WO | WO2006122233 A2 | 11/2006 |

OTHER PUBLICATIONS

International Search Report and Written Opinion—PCT/US2008/067040—ISA/EPO—Dec. 3, 2008.
Taiwan Search Report—TW097122319—TIPO—Nov. 22, 2011.

* cited by examiner

*Primary Examiner* — Chuck Huynh
(74) *Attorney, Agent, or Firm* — Eric Ho

(57) ABSTRACT

To determine a cell for usage in wireless communication, a signal-to-noise ratio or a signal-to-power ratio can be used in selecting an appropriate cell. However, cell selection can also configure to take both signal-to-noise ratio and signal-to-power ratio into account. Multiple available cells can be analyzed and a highest ranking cell can be selected through balancing the aforementioned ratios. In addition, to minimize transferring between cells, a limitation can be placed such that a cell is not left unless there is better of both the aforementioned ratios at another cell.

25 Claims, 14 Drawing Sheets

CELL SELECTION

CROSS-REFERENCE

This application claims priority to U.S. Application No. 60/944,472 entitled "METHODS AND APPARATUSES FOR INTER-FREQUENCY CELL RESELECTION", which was filed on Jun. 15, 2007. The entirety of which is herein incorporated by reference.

BACKGROUND

I. Field

The following description relates generally to wireless communications and, more particularly, to determining a cell for use based upon signal-to-noise ratio and II. Background Wireless communication systems are widely deployed to provide various types of communication content such as, for example, voice, data, and so on. Typical wireless communication systems can be multiple-access systems capable of supporting communication with multiple users by sharing available system resources (e.g. bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method for determining a cell for communication use. The method can comprise comparing a primary quality measure and a secondary quality measure of a principal cell against a primary quality measure and a secondary quality measure of at least one supplemental cell and selecting a cell for use as a function of a result of the comparison.

According to another embodiment, there can be a wireless communication apparatus that includes an evaluator that compares a primary quality measure and a secondary quality measure of a principal cell against a primary quality measure and a secondary quality measure of at least one supplemental cell and a designator that selects a cell for use as a function of a result of the comparison.

In yet another aspect, there can be a wireless communication apparatus that comprises means for comparing a primary quality measure and a secondary quality measure of a principal cell against a primary quality measure and a secondary quality measure of at least one supplemental cell. The apparatus further comprises means for selecting a cell for use as a function of a result of the comparison.

In a further aspect there can be a machine-readable medium having stored thereon machine-executable instructions for comparing a primary quality measure and a secondary quality measure of a principal cell against a primary quality measure and a secondary quality measure of at least one supplemental cell and selecting a cell for use as a function of a result of the comparison.

In accordance with one aspect, there can be In a wireless communication system, an apparatus comprising a processor configured to compare a primary quality measure and a secondary quality measure of a principal cell against a primary quality measure and a secondary quality measure of at least one supplemental cell. The processor can also be configured to select a cell for use as a function of a result of the comparison.

In another aspect, there can be a method for facilitating communication through a cell. The method can comprise determining a primary quality measure and a secondary quality measure for communication to a mobile device as well as transferring the primary quality measure and the secondary quality measure.

In a further aspect, there can be a wireless communication apparatus, comprising an identifier that determines a primary quality measure and a secondary quality measure for communication to a mobile device and an engager that transfers the primary quality measure and the secondary quality measure.

In one aspect, there can be a wireless communication apparatus comprising means for determining a primary quality measure and a secondary quality measure for communication to a mobile device. The apparatus can further comprise means for transferring the primary quality measure and the secondary quality measure.

In yet another aspect there can be a machine-readable medium having stored thereon machine-executable instructions for determining a primary quality measure and a secondary quality measure for communication to a mobile device and transferring the primary quality measure and the secondary quality measure.

In another aspect, there can be In a wireless communication system, an apparatus comprising a processor configured to determine a primary quality measure and a secondary quality measure for communication to a mobile device and transfer the primary quality measure and the secondary quality measure.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
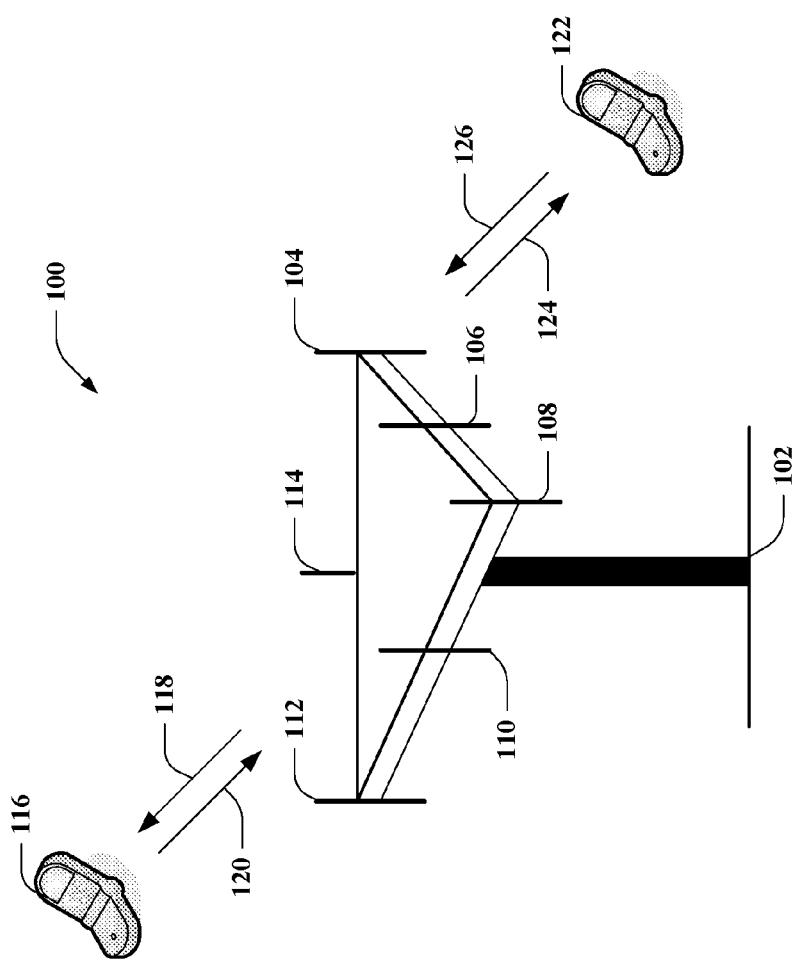
FIG. 1 is an illustration of a wireless communication system in accordance with various aspects set forth herein.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Various embodiments are now described with reference to the drawings, wherein like reference numerals are used to refer to like elements throughout. In the following description, for purposes of explanation, numerous specific details are set forth in order to provide a thorough understanding of one or more embodiments. It can be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
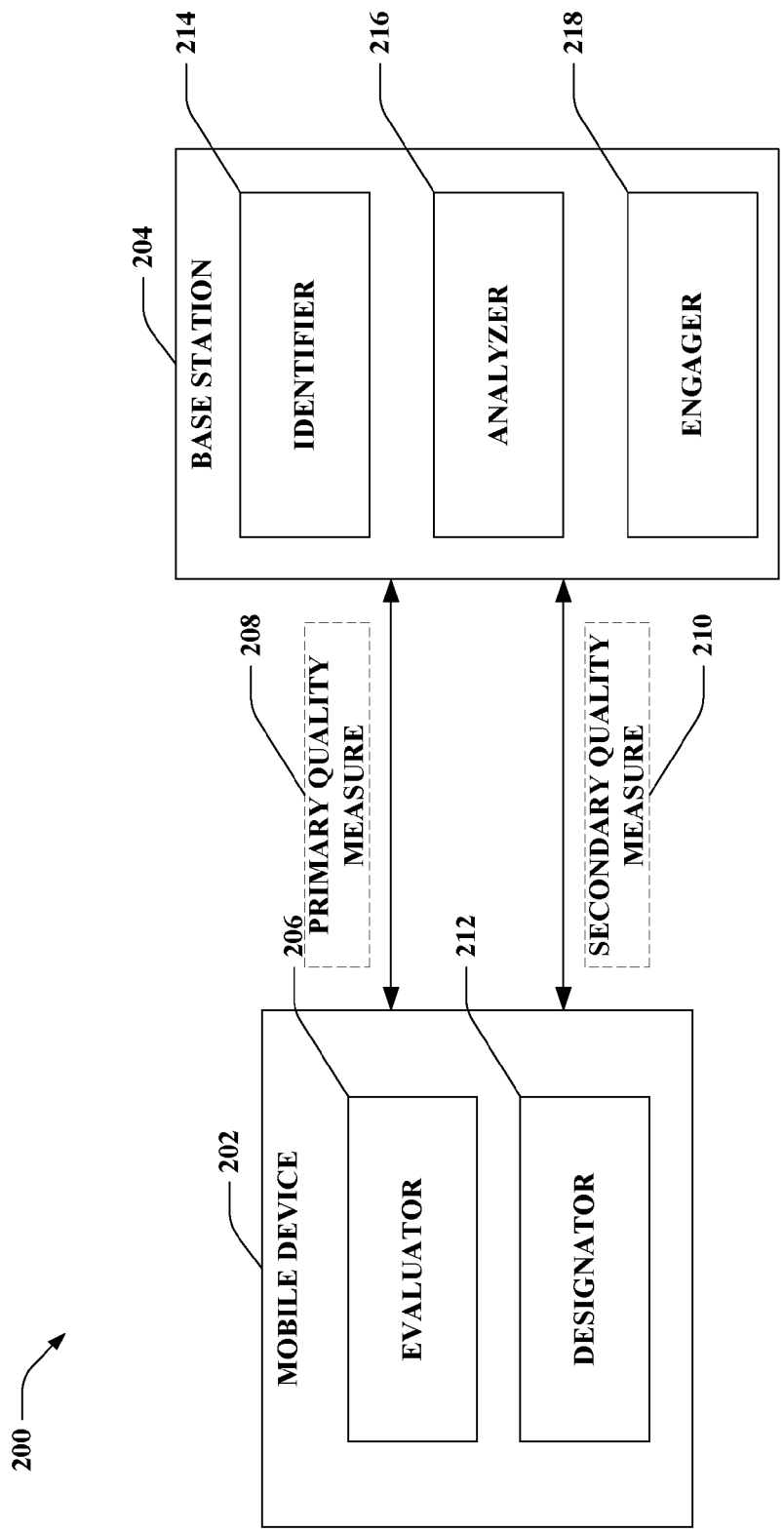
FIG. 2 is an illustration of a representative system for wireless communication taking into account quality measures in accordance with various aspects set forth herein.

Now referring to FIG. 2, an example system 200 is disclosed for facilitating wireless communication. In conventional wireless communication configurations, there is one frequency available and thus the available frequency is used in communication. However, with multiple frequencies, a device can select a frequency to use during communication. To select a frequency (e.g., and a cell to use to communicate upon the frequency), signal-to-noise ratio or signal-to-power ratio can be measured and a highest ranking cell is selected for communication pertaining to both metrics. The system 200 enables signal-to-noise ratio as well as signal-to-power ratio to be taken into account in cell selection.

Differently than for intra-frequency cell reselection where Ec/No (signal-to-noise ratio) and RSCP (Reference symbol received power—otherwise known as signal-to-power ratio) can be used interchangeably as FDD (Frequency Division Duplex) quality measure for cell reselection ranking (2 quantities could give a same ranking result since RSSI (Received signal strength indicator) is the same for all intra-frequency cells), inter-frequency cell reselection ranking can significantly change depending on which measurement quantity is used, since RSSI on the 2 frequencies can be different. Similar considerations can apply to LTE (Long Term Evolution), when there is consideration that inter-frequency cell reselection could be based on either RS-SINR (Reference symbol signal to interference plus noise ratio—otherwise known as signal-to-noise ratio) or RSRP.

In some WCDMA (Wideband Code Division Multiple Access) FDD multi-carrier (multi frequency) scenarios, cell reselection ranking based either on RSCP only or on Ec/No (e.g., RS-SINR) only measurements could not be optimal. In particular, in those problematic scenarios where service/coverage continuity and load balancing are crucial, both RSCP and Ec/No quality measures could be important for inter-frequency cell reselection performance.

A mobile device 202 can communicate with a base station 204 to facilitate selection of an appropriate cell. An evaluator 206 can compare a primary quality measure 208 and a secondary quality measure 210 of a principal cell against a primary quality measure and a secondary quality measure of at least one supplemental cell. A mathematical result can be produced highlighting cell ranking in the aforementioned quality aspects. A designator 212 can select a cell for use as a function of a result of the comparison, commonly though use of a look-up table, rule set, artificial intelligence technique, and the like. According to one embodiment, the primary quality measure is signal-to-noise ratio or signal-to-power ratio and the secondary quality measure is signal-to-noise ratio or signal-to-power ratio, where the primary quality measure and the secondary quality measure are different.

Artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g. created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, these techniques can also include methods for capture of logical relationships such as theorem provers or more heuristic rule-based expert systems. Furthermore, it is to be appreciated that more than two quality measures can be taken into account when selecting a cell for use in wireless communication.

To facilitate operation, the base station 204 can use various modules to enable the mobile device 202 to make an appropriate decision. An identifier 214 can determine a primary quality measure and a secondary quality measure for communication to the mobile device 202. For example, a request message can be emitted to the base station 204 and an automatic setting can instruct the base station 204 to emit information, the base station 204 can make an inference on what should be provided through use of artificial intelligence techniques, etc. An analyzer 216 can measure the primary quality measure and the secondary quality measure. An engager 218 can transfer the primary quality measure and the secondary quality measure, commonly to the mobile device 202. While disclosed as part of the base station 204, it is to be appreciated that the analyzer 216 can function as an independent module and apart from the identifier 214 and engager 218. Similarly, the primary quality measure can signal-to-noise ratio or signal-to-power ratio and the secondary quality measure can be signal-to-noise ratio or signal-to-power ratio, where the primary quality measure and the secondary quality measure are different.

The following is example operation concerning the system 200 as well as regarding other aspects disclosed herein. The primary quality measure can be a selected FDD reselection quality measure (Ec/No or RSCP) while the secondary quality measure can be another FDD reselection quality measure (RSCP or Ec/No). The system 200 can function to identify an overall best ranked cell that can be a highest ranked cell after ranking a serving and at least one neighbor cell based on the primary quality measure According to one embodiment, a cell reselection algorithm can be used for UMTS (Universal Mobile Telecommunications System). If a network indicates to UE (user equipment, such as the mobile device 202), in addition to a certain FDD reselection quality measure, to evaluate both RSCP and Ec/No quantities for cell reselection (e.g., by means of a parameter sent), the UE can measure both CPICH (Common Pilot Channel) Ec/No and RSCP for each cell (serving and neighbors). The UE can also rank the serving and neighbor cells based on the primary quality measure, but associating to each cell both quality measures. Moreover, if there are cells in the ranking list which have higher RSCP and Ec/No than the serving cell, then the UE can reselect to a cell with the highest primary quality measure among them. Additionally, if no cell fulfils an aforementioned condition, then the UE can reselect to the overall best ranked cell, if different than the serving cell (as per current standard mechanism, using only the primary quality measure), otherwise not reselect.

There can also be a different cell reselection algorithm for an LTE situation. A network can indicate to the UE, in addition to a certain reselection quality measure, to evaluate both RSRP and RS-SINR quantities for cell reselection (by means of a parameter sent), the UE can measure both RSRP and RS-SINR for each cell (serving and neighbors). Through use of a result of the measurement, there can be ranking the serving and neighbor cells based on the primary quality measure, but associating to each cell both quality measures. If there are cells in the ranking list which have higher RSRP and RS-SINR than the serving cell, reselection can occur to the cell with the highest primary quality measure among them. However, if no cell fulfils condition aforementioned conditions, the UE can reselect to the overall best ranked cell, if different than the serving cell, otherwise not reselect.

Other algorithms can be used, such as in an UMTS context. If a network indicates to the UE, in addition to a certain FDD reselection quality measure, to evaluate both RSCP and Ec/No quantities for cell reselection and indicates the coefficients that should be used to weight the RSCP and Ec/No measurements (by means of a parameters sent), the UE can measure both CPICH Ec/No and RSCP for each cell (serving and neighbors). With the measurement, there can be rank the serving and neighbor cells based on the following formula:

Quality of the cell=$A*(RSCP+B)+C*(Ec/No+D)$

Where A, B, C, and D can be coefficients sent in the BCCH (Broadcast Control Channel). The UE can reselect to the overall best ranked cell, if different than the serving cell otherwise not reselect.

There can also be an alternative algorithm for use in an LTE configuration. If a network indicates to the UE, in addition to a certain FDD reselection quality measure, to evaluate both RSRP and RS-SINR quantities for cell reselection and indicates the coefficients that should be used to weight the RSCP and Ec/No measurements (by means of a parameters sent), the UE should measure both RSRP and RS-SINR for each cell (serving and neighbors). With the measurement, there can be ranking the serving and neighbor cells based on the following formula:

Quality of the cell=$A*(RSRP+B)+C*(RS-SINR+D)$

Where A, B, C, and D can be coefficients sent in the BCCH. Upon using the formula, the UE can reselect to the overall best ranked cell, if different than the serving cell otherwise not reselect.

Figure 3:
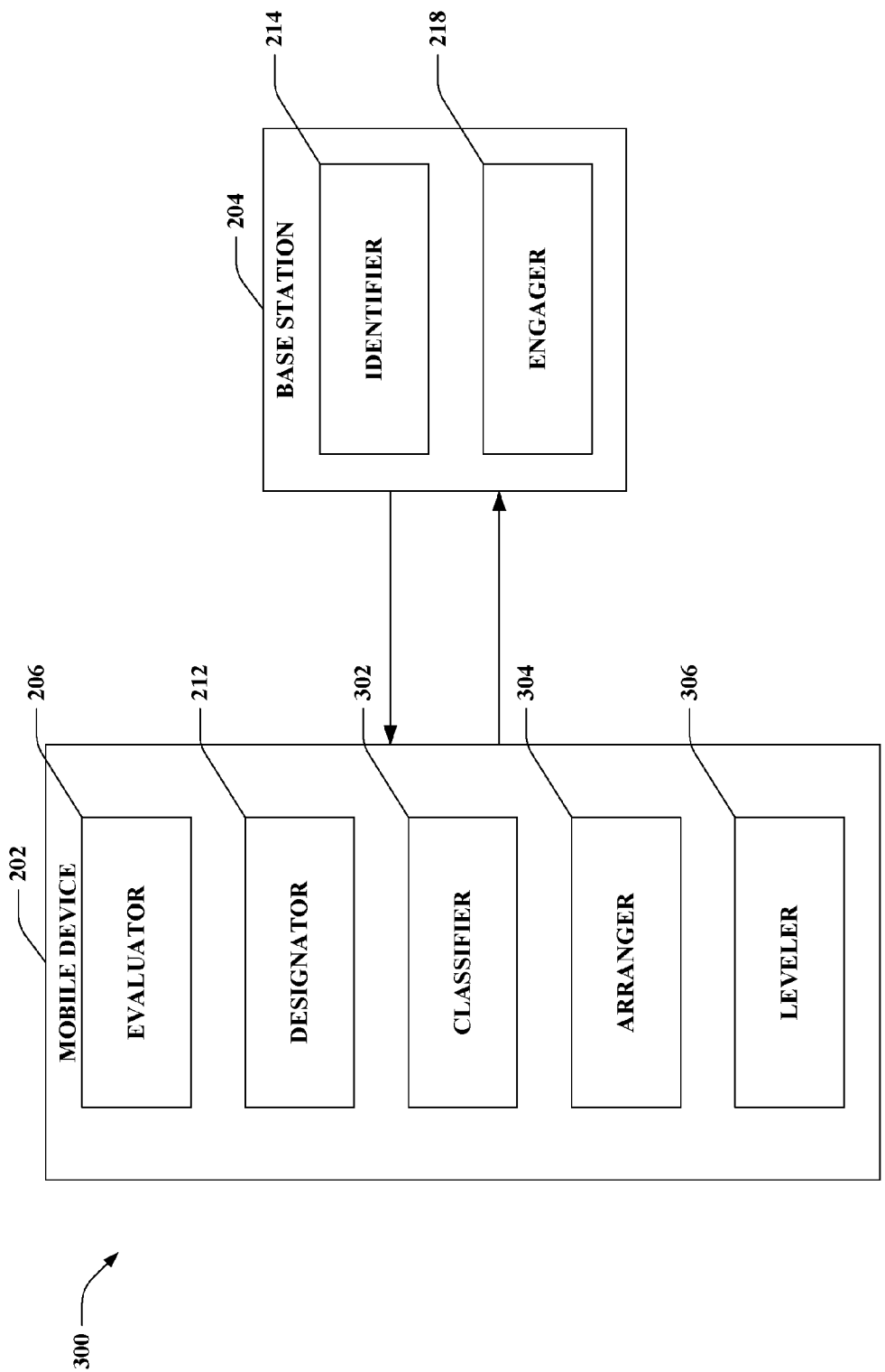
FIG. 3 is an illustration of a representative system for ranking cells in a wireless communication configuration in accordance with various aspects set forth herein.

Now referring to FIG. 3, an example system 300 is disclosed for ranking different cells in order to determine a cell for use in wireless communication. A mobile device 202 requests for a base station 204 to provide quality measure information. The base station 204 can be part of a cell where three different antennas are used. An identifier 214 can determine quality measures desired by the mobile device 202 and an engager 218 can transfer quality measure information to the mobile device 202. Multiple base stations 204 can supply quality measure information and a mobile device 202 can determine a desirable (e.g., best) cell to use.

An evaluator 206 can compare quality measure information amount available base stations 204. A designator 212 can select an appropriate cell to use based upon a result of the comparison. To facilitate selection, various modules can be used to rank and distinguish different cells. A classifier 302 can rank the cells (e.g., principal cells, supplemental cells, etc.) as a function of the primary quality measure. In addition, an arranger 304 can rank the cells as a function of the secondary quality measure. While shown as distinct entities, it is to be appreciated that the classifier 302 and the arranger 304 can function as a single module. A leveler 306 can balance a cell rank of the primary quality measure against a cell rank of the secondary quality measure, a result of the balance is used in selection.

It is possible for a single cell to have a highest rank of the primary quality measure and the secondary quality measure. In this instance, the leveler 306 can automatically designate the highest ranking cell for selection. However, if there are different highest rankings, then a decision can be made as to what cell should be used. This can include a cell that is highest ranking in at least one, a cell with a highest ranking average, and the like. Additionally, the leveler 306 can include logic to distinguish when a tie ranking occurs (e.g., selecting a more important factor, random selection, and the like).

According to one embodiment, the leveler 306 can balance a cell rank of the primary quality measure against a cell rank of the secondary quality measure functions through use of weight coefficients. For instance, the primary quality measure can be provided two times the weight of the secondary quality measure. The leveler 306 can use an algorithm to determine a cell for designation.

Figure 4:
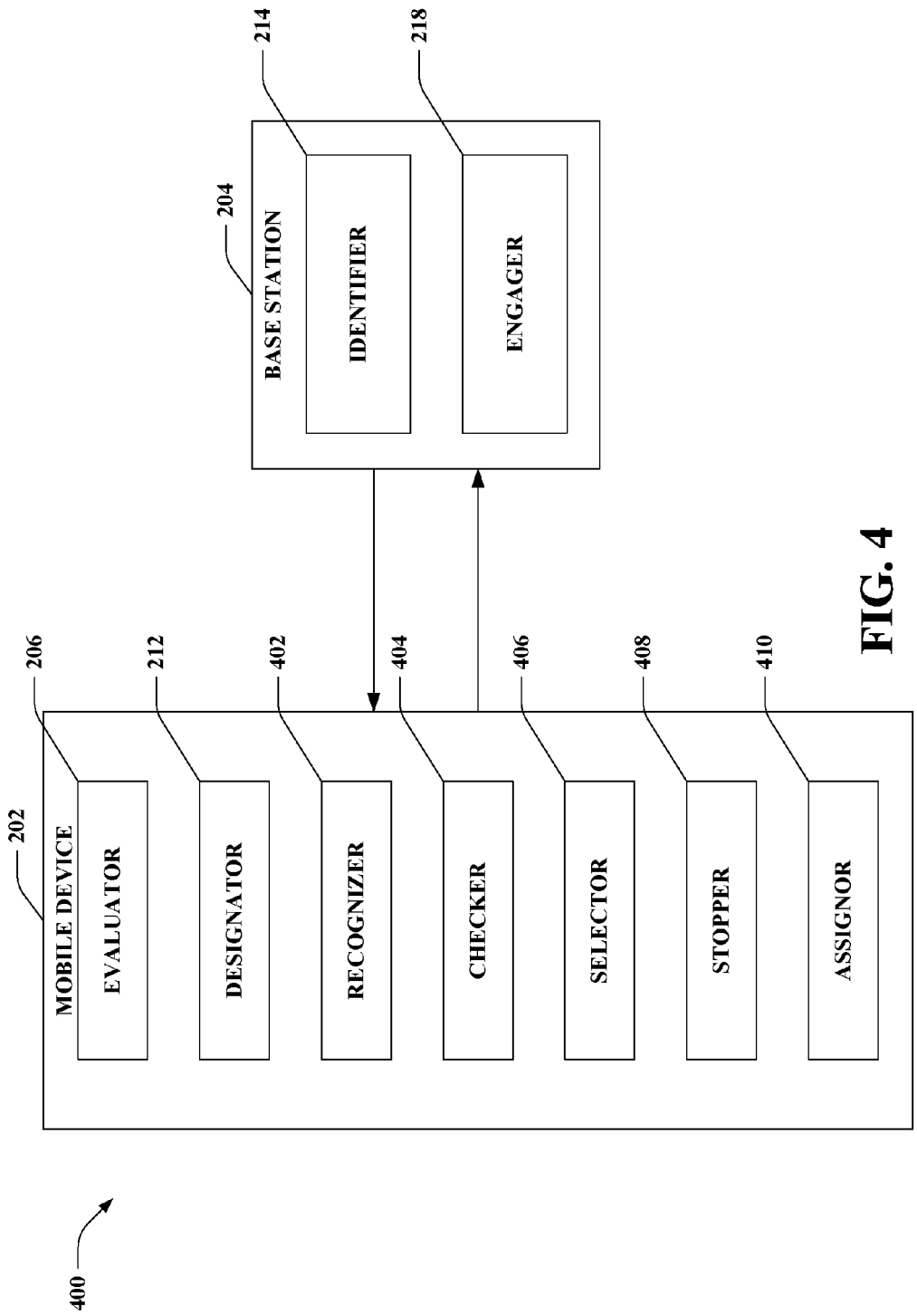
FIG. 4 is an illustration of a representative system for managing transfer amount cells for communication in accordance with various aspects set forth herein.

Now referring to FIG. 4, an example system 400 can function to shift cells among a mobile device 202. The mobile device 202 and base station 204 can engage with one another through an evaluator 206, designator 212, identifier 214, and/or engager 218 as previously discussed. Commonly, a user can be using a cell when on a wireless communication, where the used cell can be referred to as a servicing cell. A recognizer 402 can identify a servicing cell, where the servicing cell can be designated as the principal cell. According to one embodiment, there can be an interest to have a communication retain upon a cell. Therefore, a different cell is not selected and/or implemented (e.g., communication transferred from the principal cell to the supplemental cell) unless there is a substantial reason, such as both a primary quality measure and secondary quality measure improve against the supplemental cell.

A checker 404 can determine if a supplemental cell has a higher primary quality measure and a higher secondary quality measure than the servicing cell. Commonly, values of the quality measures can be taken and compared and a result of the comparison analyzed. Quality measures can be represented as numerical values, levels (e.g., high, medium, low), status (e.g., on/off), and the like. A selector 406 can choose the supplemental cell for usage if the supplemental cell has higher primary quality measure and higher secondary quality measure than the servicing cell. However, a stopper 408 can retain (e.g., facilitate the mobile device 202 to retain) the principal cell as the servicing cell if the supplemental cell does not have higher primary quality measure and higher secondary quality measure than the servicing cell. Thus, the checker can operate as a controller, where active signals can be fed to the selector 406 and/or stopper 408 based upon the determination. It can be possible for more than one cell to be better than a servicing cell. Therefore, an assignor 410 can be used that designates a cell for use if there is more than one supplemental cell has higher primary quality measure and higher secondary quality measure than the servicing cell.

Figure 5:
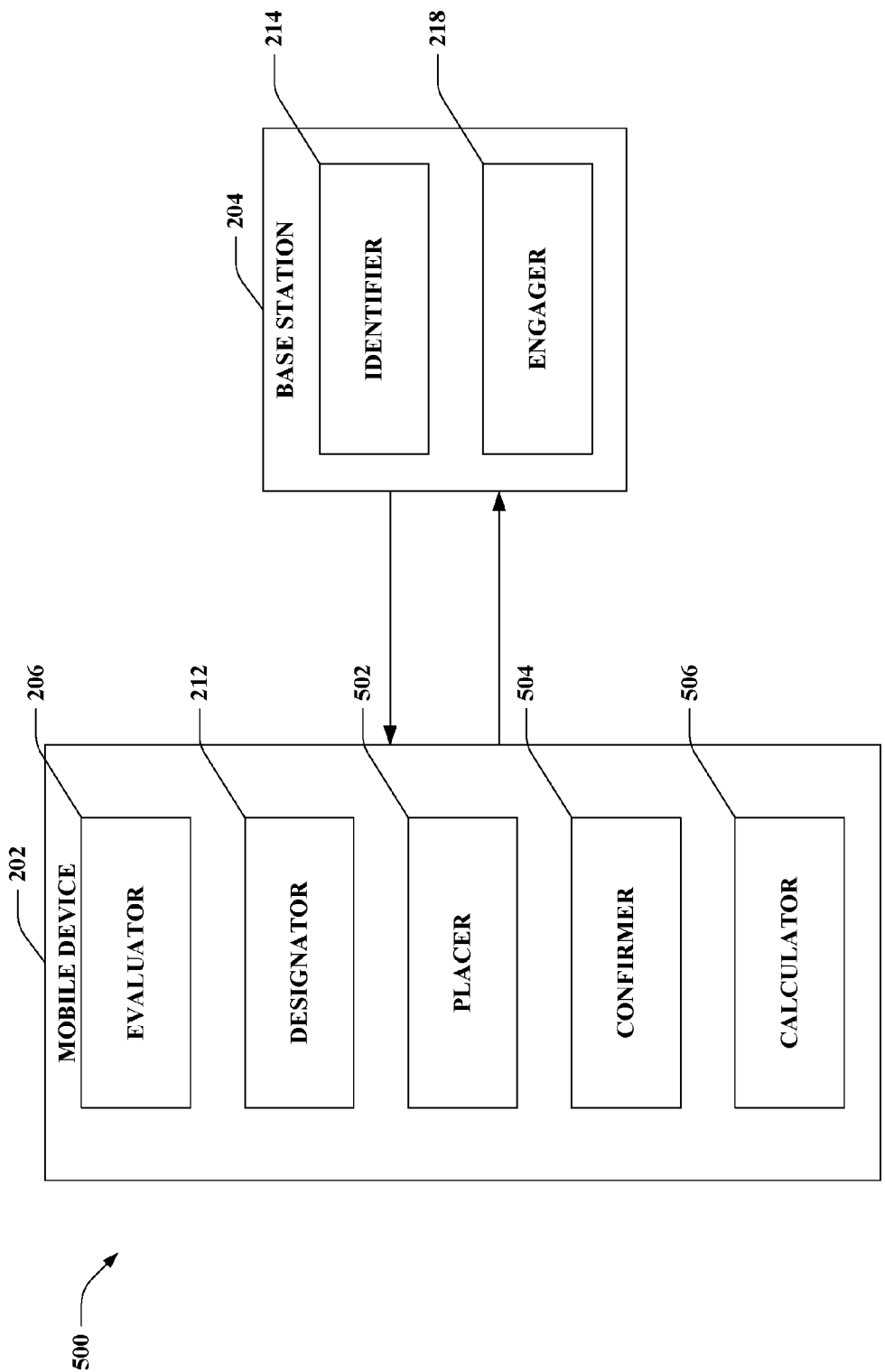
FIG. 5 is an illustration of a representative system for determining quality measures and ranking cells according to the measures in accordance with various aspects set forth herein.

Now referring to FIG. 5, an example system 500 for ranking cells in regard to wireless communication. The mobile device 202 and base station 204 can engage with one another through an evaluator 206, designator 212, identifier 214, and/or engager 218 as previously discussed. Based upon a comparison of cells, ranks can be use to distinguish cells from one another. A placer 502 can rank the principal cell and the at least one supplemental cell as a function of the primary quality measure and the secondary quality measure—commonly, a highest ranking cell is selected. Rankings can be dependent (e.g., cell A is 'x' amount bigger than cell B and the rank takes 'x' into account) or independent (e.g., if cell A is higher than cell B, then cell A is given a rank of 'y' while cell B is given a rank of 'y+1' regardless of how much higher cell B is then cell A).

Once ranked, a confirmer 504 can check if a ranked cell has a highest primary quality measure and a highest secondary quality measure. If a cell has higher quality measures then other cells, then the cell can be automatically selected (e.g., a top rated cell in all categories is therefore the top rated cell). Depending on a configuration, ties can be included or excluded. Thus, a cell with the highest primary quality measure and the highest secondary quality measure can be elected. A calculator 506 can be used to measure the primary quality measure or the secondary quality measure, commonly of a cell used by the mobile device 202. This can save needless communication (e.g., and thus save resources) with a base station (e.g., the base station 204) that provides a servicing cell. Measurements of the calculator 506 can be used by the evaluator 206, designator 212, confirmer 504, calculator 506, other entities pertaining to the mobile device 202, etc.

Referring to FIGS. 6-9, methodologies relating to a cell selection are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 6:
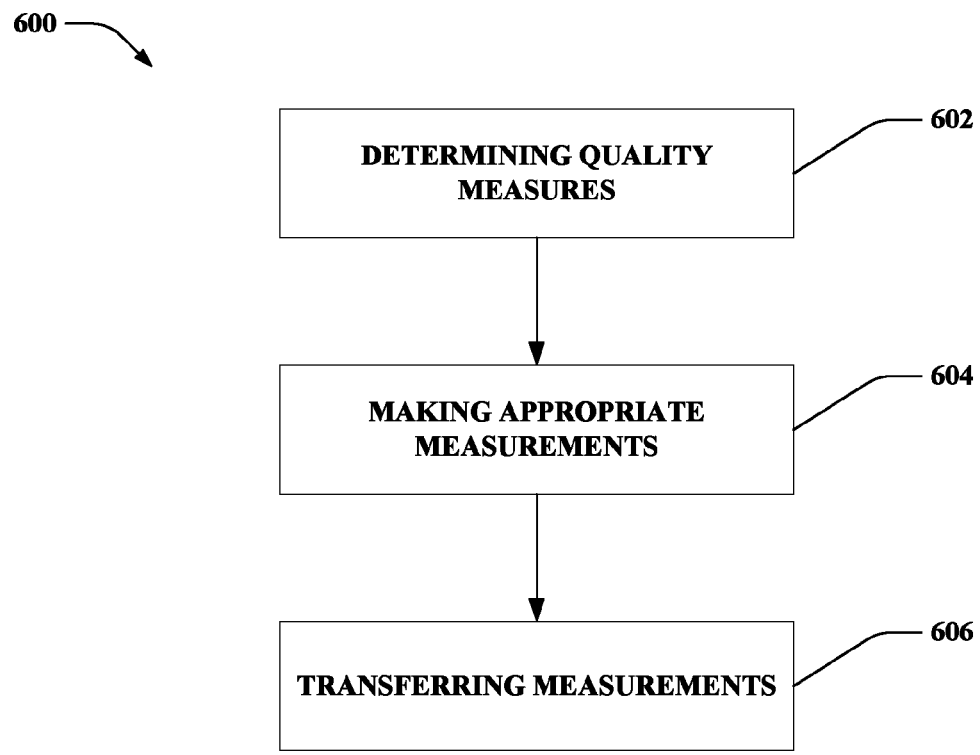
FIG. 6 is an illustration of a representative methodology for providing quality measure information in accordance with various aspects set forth herein.

Now referring to FIG. 6, an example methodology 600 is disclosed for producing quality measures to a mobile device. At action 602, there can be determining a primary quality measure and a secondary quality measure for communication to a mobile device. This can be done through request of a user, artificial intelligence determination, observation of information transferred from other base stations, provided through a central host, and the like.

At event 604, measuring the primary quality measure and the secondary quality measure can occur. According to one embodiment, measurement of various quality measures can occur without provocation from action 602. When action 602 is processed, measured information can be designated. However, measurement can also be performed with the determination is made and set to idol otherwise.

Quality measure information can be emitted at act 606; thus, there can be transferring the primary quality measure and the secondary quality measure. Transferring of information can be continuous (e.g., as information is gathered), performed upon completion, performed upon completion of a quality measure, and the like. According to one configuration, the primary quality measure is signal-to-noise ratio or signal-to-power ratio and the secondary quality measure is signal-to-noise ratio or signal-to-power ratio, where the primary quality measure and the secondary quality measure are different.

Figure 7:
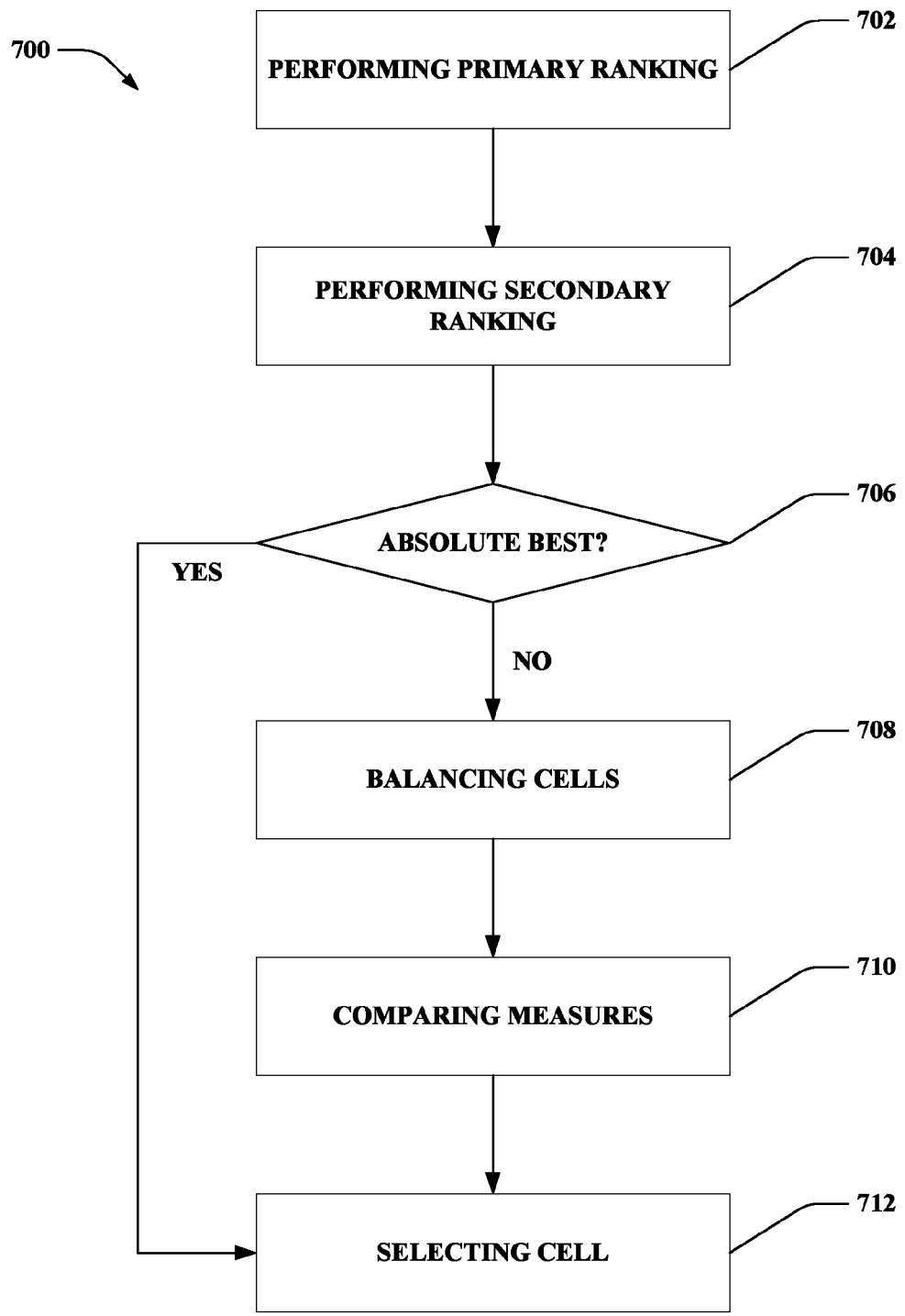
FIG. 7 is an illustration of a representative methodology for ranking cell and selecting a cell based upon the ranking in accordance with various aspects set forth herein.

Now referring to FIG. 7, an example methodology 700 is disclosed for selecting cells based upon comparing rankings. Different rankings can be tracked based upon varying quality measures (e.g., one ranking for signal-to-noise ratio, another ranking for signal-to-power ratio, etc.) Act 702 can represent ranking the cells as a function of the primary quality measure while event 704 represents ranking the cells as a function of the secondary quality measure.

It is possible that one cell ranks higher in all metrics—a check 706 can determine if this is a case, commonly through a quick comparison. If there is not absolute best cell, then balancing a cell rank of the primary quality measure against a cell rank of the secondary quality measure can occur at event 708 (e.g., through use of weight factors). There can be a comparison of a primary quality measure and a secondary quality measure of a principal cell against a primary quality measure and a secondary quality measure of at least one supplemental cell through act 710. Ultimately, there can be a selection of a cell for use as a function of a result of the comparison can occur at event 712 if an absolute best cell is determined through the check 706, identified through the comparison at act 710, and the like.

Figure 8:
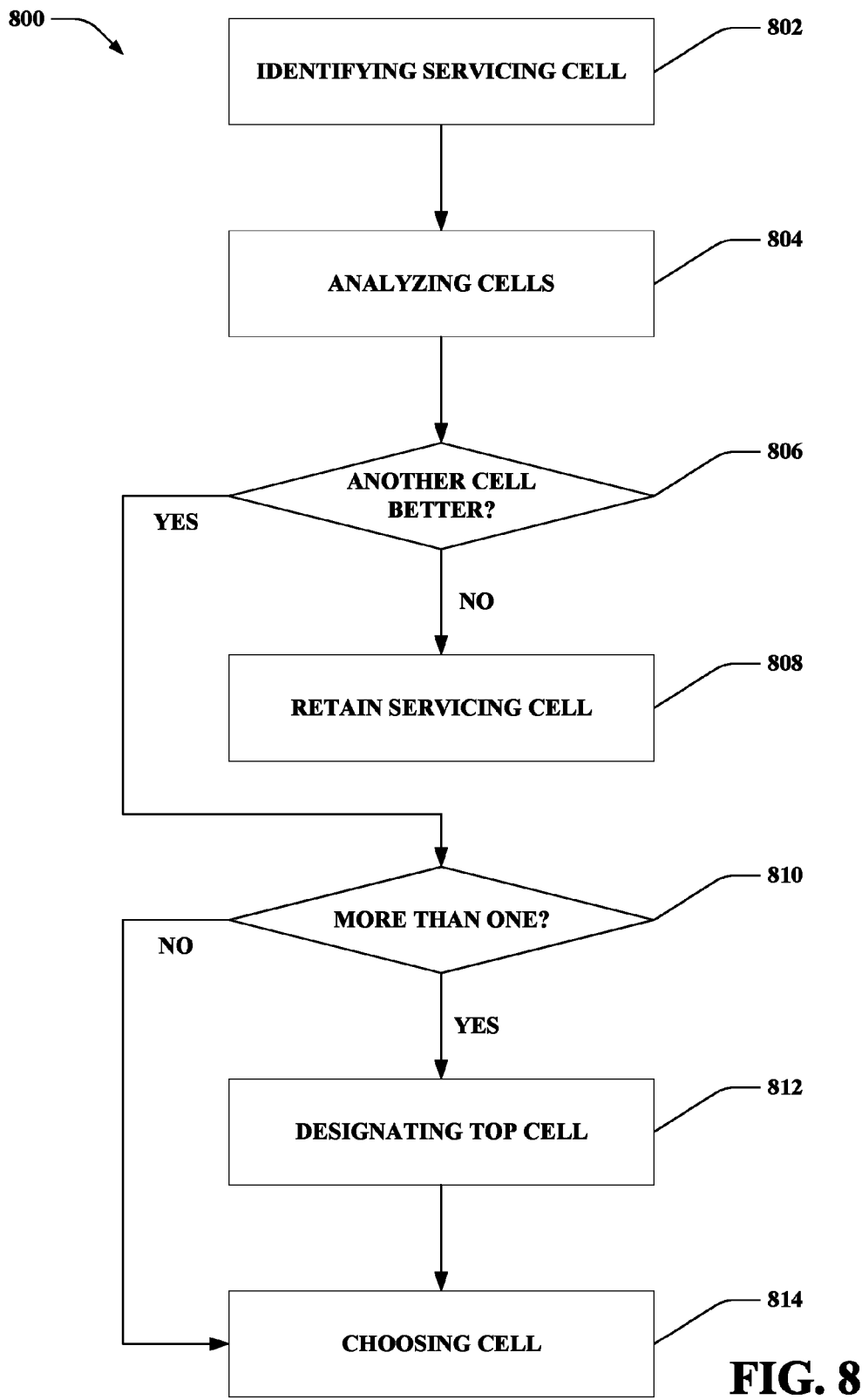
FIG. 8 is an illustration of a representative methodology for choosing an improved cell in accordance with various aspects set forth herein.

Now referring to FIG. 8, an example methodology 800 is disclosed that relates to managing a communication session concerning leaving one cell for another. A determination can be made if a communication session is active for a mobile device and if there is an active communication session, then there can be identifying a servicing cell at act 802. According to one embodiment, the servicing cell can be designated as the principal cell.

Cells can be analyzed at action 804 (e.g. principal cell, at least one supplemental cell, etc.) and at check 806 there can be determining if a supplemental cell has a higher primary quality measure and a higher secondary quality measure than the servicing cell. The determination can be made through comparing a primary quality measure and a secondary quality measure of a principal cell against a primary quality measure and a secondary quality measure of at least one supplemental cell. If another cell is not considered better (e.g., all metrics are not greater than those of a servicing cell, a cell is not better after application of weight factors, etc.), then the methodology 800 can move to act 808 to retain the principal cell as the servicing cell if the supplemental cell does not have higher primary quality measure and higher secondary quality measure than the servicing cell.

If there is another cell that is better, then a check 810 can be performed to determine if there is more than one improved cell. With multiple improved cells, there can be designating a cell for use at act 812. Thus, this can occur if there is more than one supplemental cell has higher primary quality measure and higher secondary quality measure than the servicing cell. After designating a cell, upon determining there is not more than one cell at check 810, there can be choosing the supplemental cell for usage at act 814 if the supplemental cell has higher primary quality measure and higher secondary quality measure than the servicing cell. Act 814 can function as selecting a cell for use as a function of a result of the comparison.

Figure 9:
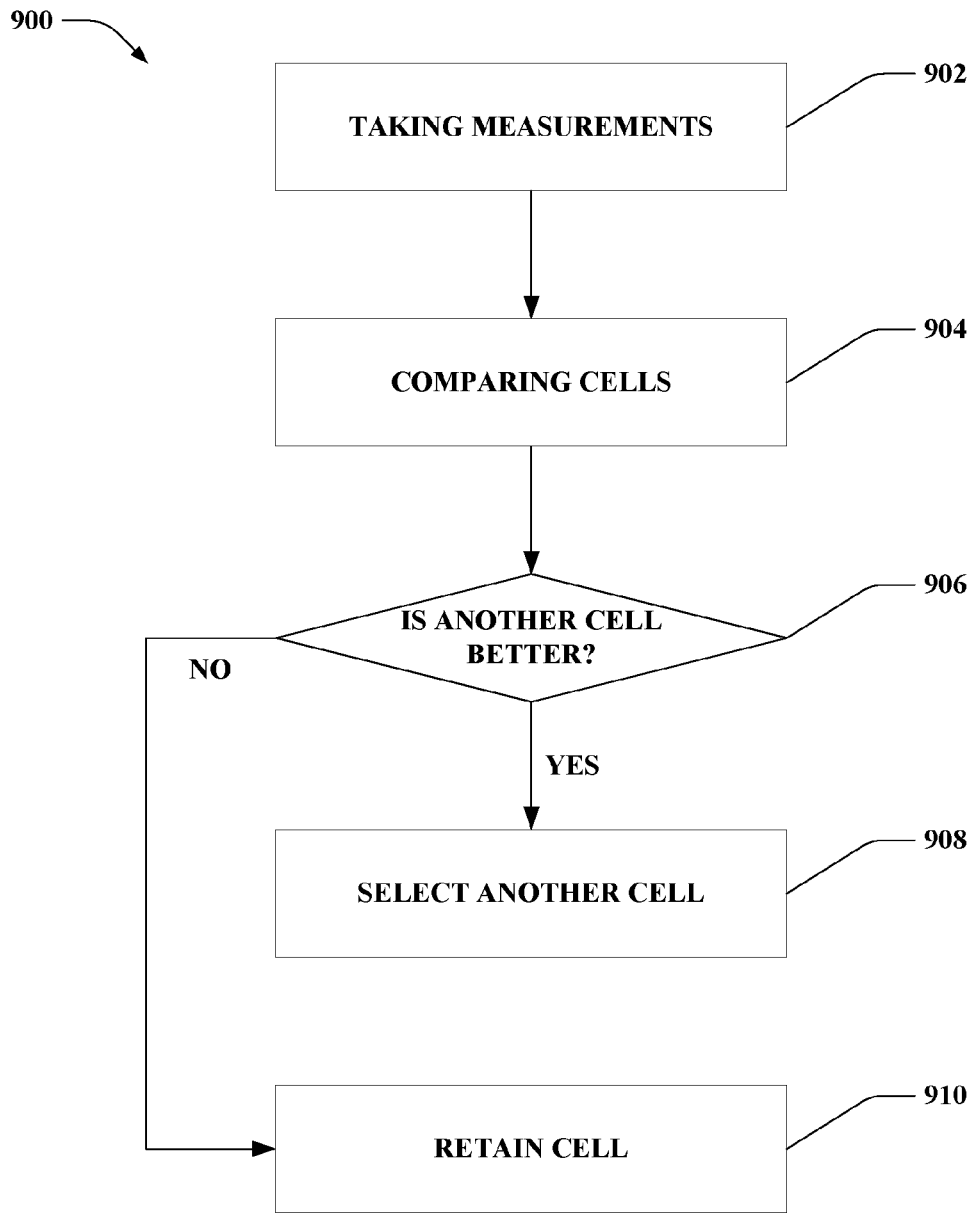
FIG. 9 is an illustration of a representative methodology for measuring cells in accordance with various aspects set forth herein.

Now referring to FIG. 9, an example methodology 900 for measuring quality metrics in relation to a cell used in wireless communication. At block 902, there can be measuring a primary quality measure or the secondary quality measure for at least one cell. At act 904, there can be comparing a primary quality measure and a secondary quality measure of a principal cell against a primary quality measure and a secondary quality measure of at least one supplemental cell. The compared measures can be obtained through practice of block 902.

Based upon the comparison, a check 906 can be performed to determine if there is another cell that is better than the principal cell. If another cell is designated as better, then another cell can be selected at act 908. However, if the check 906 determines that there is no better cell, then a servicing cell can be retained at event 910. Act 908 and/or event 910 can function as selecting a cell for use as a function of a result of the comparison.

It will be appreciated that, in accordance with one or more aspects described herein, inferences can be made regarding a particular cell to select, a weight given to a quality measure, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a cell based in part on the situation. By way of further illustration, an inference can be made related to selecting a number of quality measures to use in cell selection, a specific cell for use in communication, etc. It will be appreciated that the foregoing examples are illustrative in nature and are not intended to limit the number of inferences that can be made or the manner in which such inferences are made in conjunction with the various embodiments and/or methods described herein.

Figure 10:
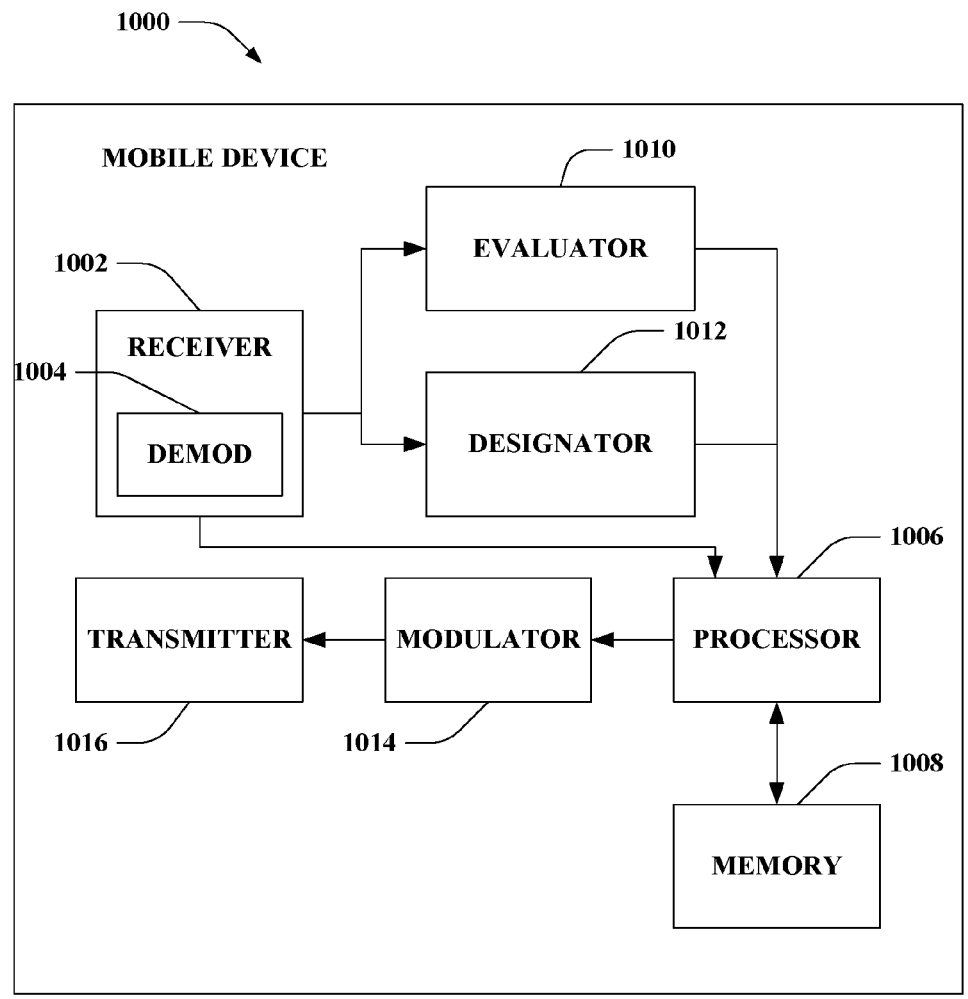
FIG. 10 is an illustration of an example mobile device that facilitates sell selection in accordance with various aspects set forth herein.

FIG. 10 is an illustration of a mobile device 1000 that facilitates selection of a cell for wireless communication. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000.

Mobile device 1000 can additionally comprise memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1002 is further operatively coupled an evaluator 1010 and/or a designator 1012. The evaluator 1010 can compares a primary quality measure and a secondary quality measure of a principal cell against a primary quality measure and a secondary quality measure of at least one supplemental cell. The designator 1012 can select a cell for use as a function of a result of the comparison. Mobile device 1000 still further comprises a modulator 1014 and the transmitter 1016 that transmits a signal (e.g., base CQI and differential CQI) to, for instance, a base station, another mobile device, etc. Although depicted as being separate from the processor 1006, it is to be appreciated that the evaluator 1010 and/or the designator 1012 can be part of processor 1006 or a number of processors (not shown).

Figure 11:
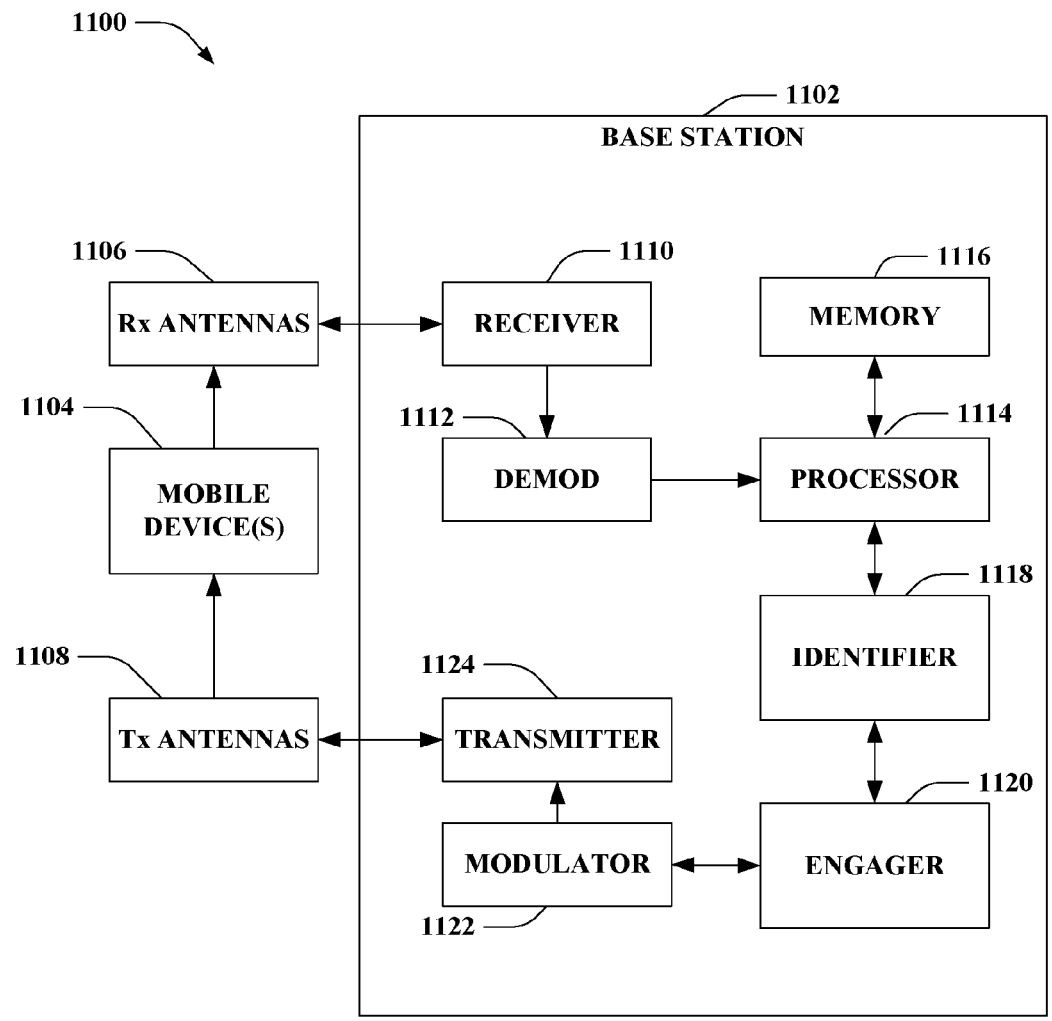
FIG. 11 is an illustration of an example system that facilitates providing information to make an informed cell selection in accordance with various aspects set forth herein.

FIG. 11 is an illustration of a system 1100 that facilitates communication through use of a cell. System 1100 comprises a base station 1102 (e.g., access point, . . . ) with a receiver 1110 that receives signal(s) from one or more mobile devices 1104 through a plurality of receive antennas 1106, and a transmitter 1122 that transmits to the one or more mobile devices 1104 through a plurality of transmit antennas 1108. Receiver 1110 can receive information from receive antennas 1106 and is operatively associated with a demodulator 1112 that demodulates received information—example information can include a PDU and/or control PDU. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein.

Processor 1114 is further coupled to an identifier 1118 and/or an engager 1120. The identifier 1118 can determine a primary quality measure and a secondary quality measure for communication to a mobile device. The engager 1120 can transfer the primary quality measure and the secondary quality measure. Although depicted as being separate from the processor 1114, it is to be appreciated that the identifier 1118 and/or an engager 1120 can be part of processor 1114 or a number of processors (not shown).

Figure 12:
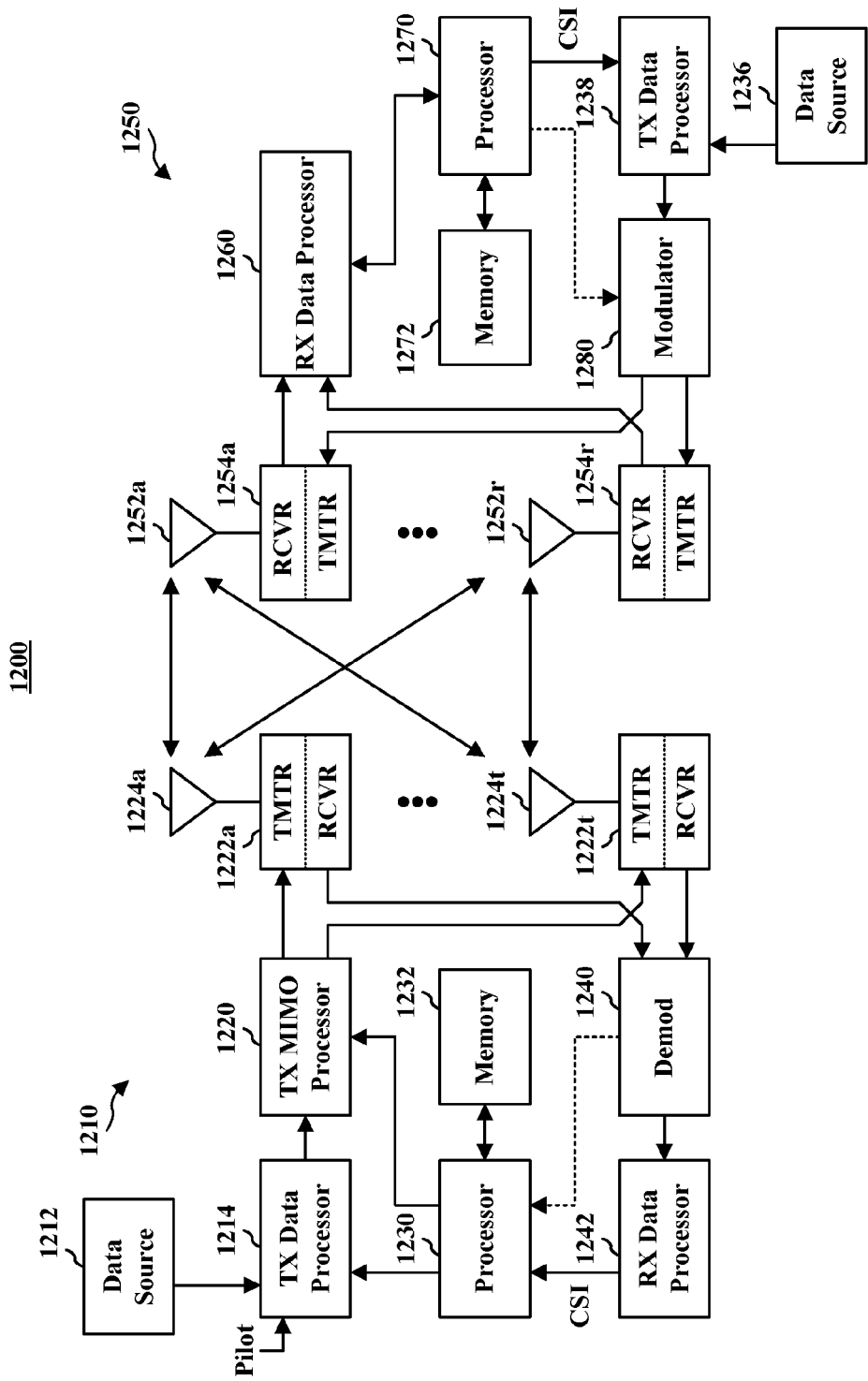
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-5 and 10-11) and/or methods (FIGS. 6-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which preceding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which preceding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
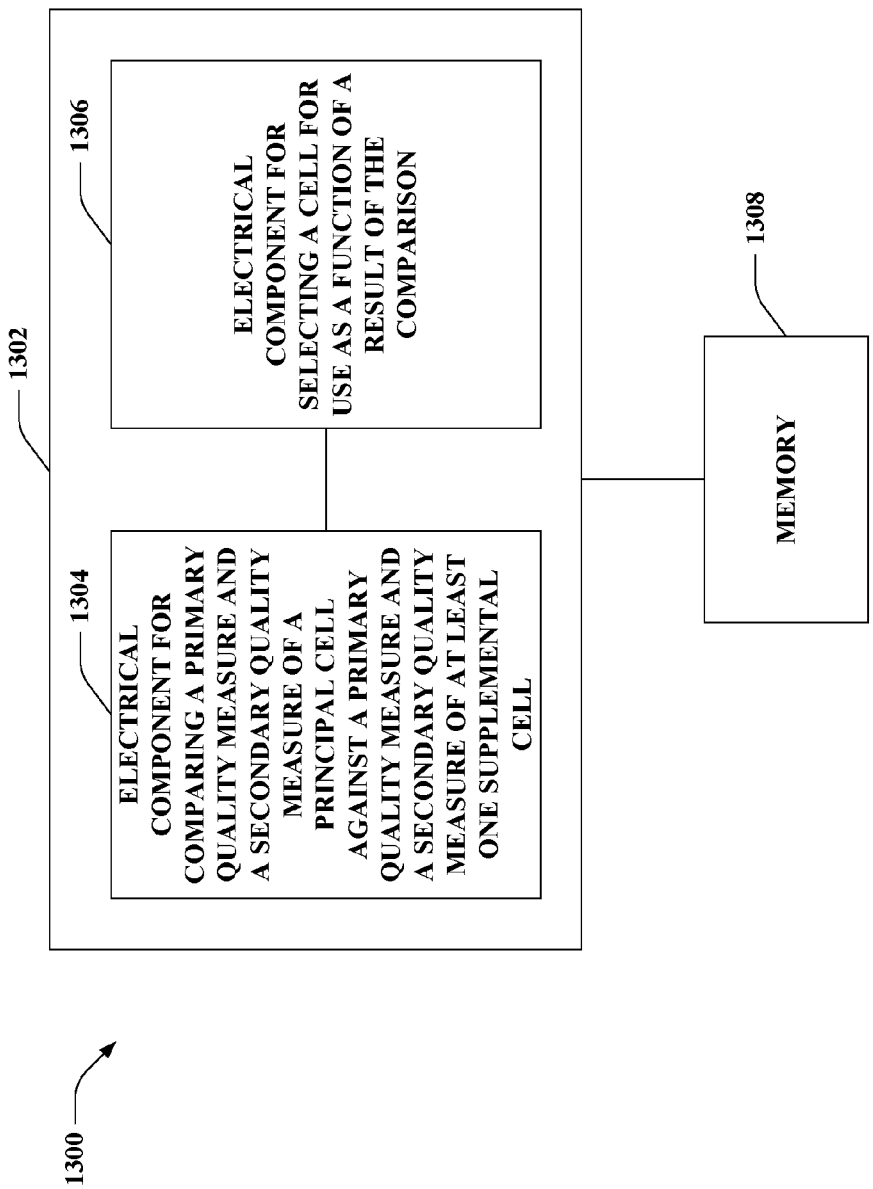
FIG. 13 is an illustration of an example system that facilitates cell selection in accordance with various aspects set forth herein.

With reference to FIG. 13, illustrated is a system 1300 that effectuates communication through use of a cell. For example, system 1300 can reside at least partially within a mobile device. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component comparing a primary quality measure and a secondary quality measure of a principal cell against a primary quality measure and a secondary quality measure of at least one supplemental cell 1304. Moreover, the logical grouping 1302 can include an electrical component for selecting a cell for use as a function of a result of the comparison 1306.

The logical grouping 1302 can also include (e.g., inherent through the logical grouping 1302 and/or the logical grouping 1304) an electrical component for ranking the principal cell and the at least one supplemental cell as a function of the primary quality measure and the secondary quality measure (e.g., a highest ranking cell is selected), an electrical component for checking if a ranked cell has a highest primary quality measure and a highest secondary quality measure (e.g., a cell with the highest primary quality measure and the highest secondary quality measure is selected), an electrical component for ranking the cells as a function of the primary quality measure, an electrical component for ranking the cells as a function of the secondary quality measure, an electrical component for balancing a cell rank of the primary quality measure against a cell rank of the secondary quality measure, an electrical component for identifying a servicing cell, the servicing cell is the principal cell, an electrical component for determining if a supplemental cell has a higher primary quality measure and a higher secondary quality measure than the servicing cell, an electrical component for choosing the supplemental cell for usage if the supplemental cell has higher primary quality measure and higher secondary quality measure than the servicing cell, an electrical component for retaining the principal cell as the servicing cell if the supplemental cell does not have higher primary quality measure and higher secondary quality measure than the servicing cell, an electrical component for designating a cell for use if there is more than one supplemental cell has higher primary quality measure and higher secondary quality measure than the servicing cell, an electrical component for measuring the primary quality measure of the secondary quality measure, and the like. According to one embodiment, the primary quality measure is signal-to-noise ratio or signal-to-power ratio and the secondary quality measure is signal-to-noise ratio or signal-to-power ratio, the primary quality measure and the secondary quality measure are different. Also, the electrical component for balancing a cell rank of the primary quality measure against a cell rank of the secondary quality measure can function through use of weight coefficients. Additionally, system 1300 can include a memory 1308 that retains instructions for executing functions associated with electrical components 1304 and 1306. While shown as being external to memory 1308, it is to be understood that one or more of electrical components 1304 and 1306 can exist within memory 1308.

Figure 14:
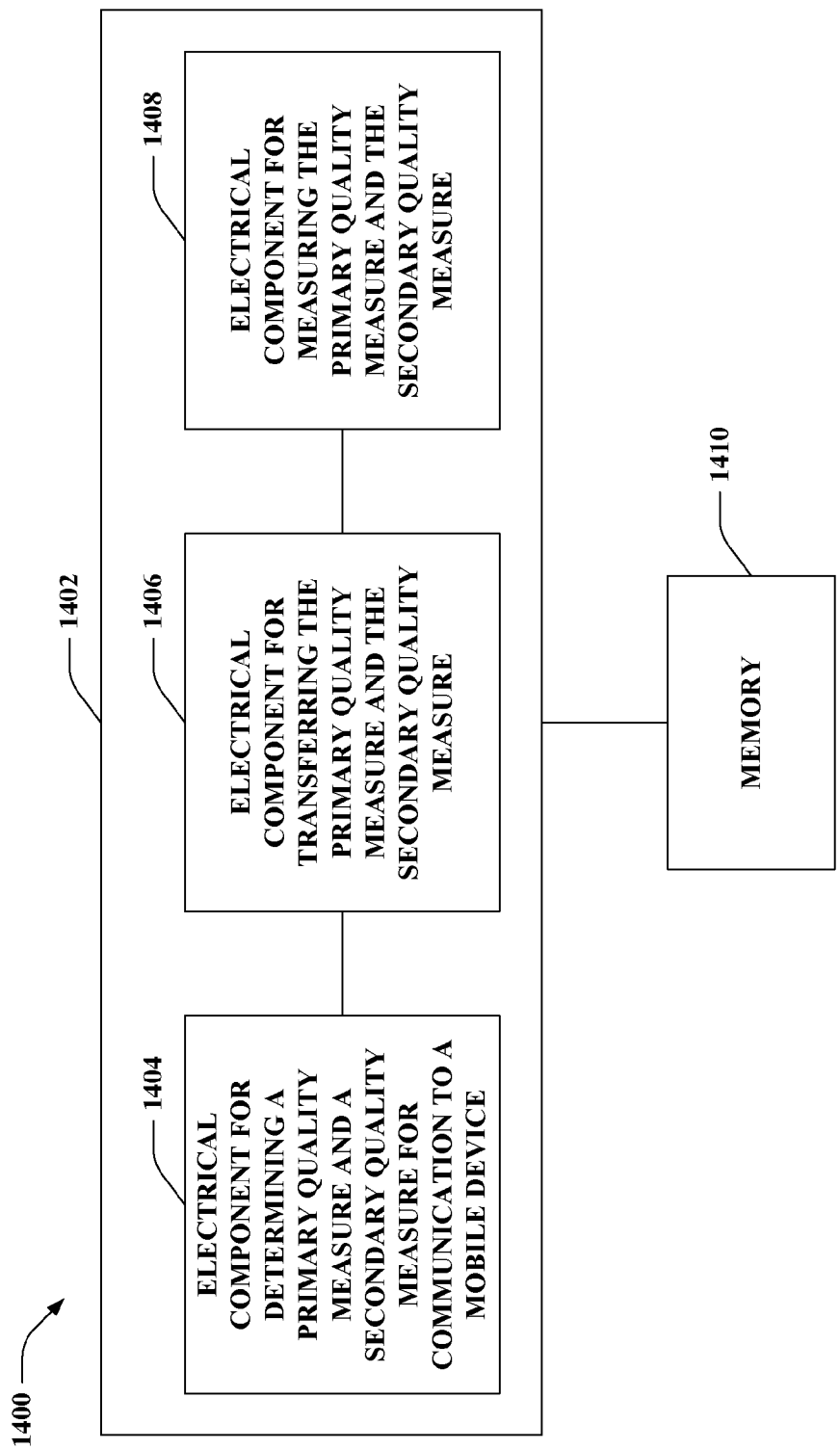
FIG. 14 is an illustration of an example system that facilitate quality measure supply in accordance with various aspects set forth herein.

Turning to FIG. 14, illustrated is a system 1400 that effectuates processing of a PDU and performs at least one operation in relation to if the transfer is successful. For example, system 1400 can reside at least partially within a mobile device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for authenticating a control protocol data unit 1404. Moreover, the logical grouping 1402 can include an electrical component for producing a notice for a module that sends the control protocol data unit to reset a counter upon successful authentication of the control protocol data unit 1406.

The logical grouping 1402 can also include an electrical component for transferring the notice to the module, an electrical component for collecting the control protocol data unit, and/or an electrical component for extracting identification data from the collected control protocol data, the identification data is used in transferring the notice to the module; these components can integrate as part of the electrical component for authenticating a control protocol data unit 1404 and/or the electrical component for producing a notice for a module that sends the control protocol data unit to reset a counter upon successful authentication of the control protocol data unit 1406, as independent entities, and the like. While shown as being external to memory 1408, it is to be understood that electrical components 1404 and 1406 can exist within memory 1410.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for determining a cell for communication use, comprising:
measuring a respective primary quality measure and a respective secondary quality measure of a principal cell and at least one supplemental cell, wherein:
the respective primary quality measures are a signal-to-noise ratio or a signal-to-power ratio,
the respective secondary quality measures are a signal-to-noise ratio or a signal-to-power ratio, and
the respective primary quality measures are not the same ratio as the respective secondary quality measures;
weighting the respective primary quality measures and the respective secondary quality measures of the principal cell and the at least one supplemental cell using respective weight coefficients;
calculating a quality of the principal cell by adding the weighted respective primary quality measure of the principal cell with the weighted respective secondary quality measure of the principal cell;
calculating a quality of the at least one supplemental cell by adding the weighted respective primary quality measure of the at least one supplemental cell with the weighted respective secondary quality measure of the at least one supplemental cell;
ranking the principal cell and the at least one supplemental cell based on the quality of the principal cell and the quality of the at least one supplemental cell; and
selecting one of the principal cell or the at least one supplemental cell for use based on a result of the ranking.

2. The method of claim 1, wherein the respective primary quality measure and the respective secondary quality measure are independent of each other.

3. The method of claim 1, wherein the selecting includes selecting the cell having a highest calculated quality.

4. The method of claim 1, wherein the weight coefficients are received from a network.

5. The method of claim 1, wherein the principal cell is a servicing cell.

6. A wireless communication apparatus, comprising:
a signal measuring circuit that is configured to measure a respective primary quality measure and a respective secondary quality measure of a principal cell and at least one supplemental cell, wherein:
the respective primary quality measures are a signal-to-noise ratio or a signal-to-power ratio,
the respective secondary quality measures are a signal-to-noise ratio or a signal-to-power ratio, and
the respective primary quality measures are not the same ratio as the respective secondary quality measures;
an evaluator that is configured to:
weight the respective primary quality measures and the respective secondary quality measures of the principal cell and the at least one supplemental cell using respective weight coefficients;
calculate a quality of the principal cell by adding the weighted respective primary quality measure of the principal cell with the weighted respective secondary quality measure of the principal cell; and
calculate a quality of the at least one supplemental cell by adding the weighted respective primary quality measure of the at least one supplemental cell with the weighted respective secondary quality measure of the at least one supplemental cell;
a placer that is configured to rank the principal cell and the at least one supplemental cell based on the quality of the principal cell and the quality of the at least one supplemental cell; and
a designator that is configured to select one of the principal cell or the at least one supplemental cell for use based on a result of the ranking.

7. The wireless communication apparatus of claim 6, wherein the respective primary quality measure and the respective secondary quality measure are independent of each other.

8. The wireless communication apparatus of claim 6, wherein the selecting includes selecting the cell having a highest calculated quality.

9. The wireless communication apparatus of claim 6, wherein the weight coefficients are received from a network.

10. The wireless communication apparatus of claim 6, wherein the principal cell is a servicing cell.

11. A wireless communications apparatus, comprising:
means for measuring a respective primary quality measure and a respective secondary quality measure of a principal cell and at least one supplemental cell, wherein:
the respective primary quality measures are a signal-to-noise ratio or a signal-to-power ratio,
the respective secondary quality measures are a signal-to-noise ratio or a signal-to-power ratio, and
the respective primary quality measures are not the same ratio as the respective secondary quality measures;
means for weighting the respective primary quality measures and the respective secondary quality measures of the principal cell and the at least one supplemental cell using respective weight coefficients;
means for calculating a quality of the principal cell by adding the weighted respective primary quality measure of the principal cell with the weighted respective secondary quality measure of the principal cell;
means for calculating a quality of the at least one supplemental cell by adding the weighted respective primary quality measure of the at least one supplemental cell with the weighted respective secondary quality measure of the at least one supplemental cell;
means for ranking the principal cell and the at least one supplemental cell based on the quality of the principal cell and the quality of the at least one supplemental cell; and
means for selecting one of the principal cell or the at least one supplemental cell based on a result of the ranking.

12. The wireless communcation apparatus of claim 11, wherein the respective primary quality measure and the respective secondary quality measure are independent of each other.

13. The wireless communication apparatus of claim 11, wherein the means for selecting includes means for selecting the cell having a highest calculated quality.

14. The wireless communication apparatus of claim 11, wherein the weight coefficients are received from a network.

15. The wireless communication apparatus of claim 11, wherein the principal cell is a servicing cell.

16. A non-transient machine-readable medium having stored thereon machine-executable instructions for:
measuring a respective primary quality measure and a respective secondary quality measure of a principal cell and at least one supplemental cell, wherein:
the respective primary quality measures are a signal-to-noise ratio or a signal-to-power ratio,
the respective secondary quality measures are a signal-to-noise ratio or a signal-to-power ratio, and
the respective primary quality measures are not the same ratio as the respective secondary quality measures;
weighting the respective primary quality measures and the respective secondary quality measures of the principal cell and the at least one supplemental cell using respective weight coefficients;
calculating a quality of the principal cell by adding the weighted respective primary quality measure of the principal cell with the weighted respective secondary quality measure of the principal cell;
calculating a quality of the at least one supplemental cell by adding the weighted respective primary quality measure of the at least one supplemental cell with the weighted respective secondary quality measure of the at least one supplemental cell;
ranking the principal cell and the at least one supplemental cell based on the quality of the principal cell and the quality of the at least one supplemental cell; and
selecting one of the principal cell or the at least one supplemental cell for use based on a result of the ranking.

17. A non-transient machine-readable medium of claim 16, wherein the respective primary quality measure and the respective secondary quality measure are independent of each other.

18. A non-transient machine-readable medium of claim 16, wherein the selecting includes selecting the cell having a highest calculated quality.

19. A non-transient machine-readable medium of claim 16, wherein the weight coefficients are received from a network.

20. A non-transient machine-readable medium of claim 16, wherein the principal cell is a servicing cell.

21. In a wireless communication system, an apparatus comprising:
a processor configured to:
measure a respective primary quality measure and a respective secondary quality measure of a principal cell and at least one supplemental cell, wherein:
the respective primary quality measures are a signal-to-noise ratio or a signal-to-power ratio,
the respective secondary quality measures are a signal-to-noise ratio or a signal-to-power ratio, and
the respective primary quality measures are not the same ratio as the respective secondary quality measures;
weight the respective primary quality measures and the respective secondary quality measures of the principal cell and the at least one supplemental cell using respective weight coefficients;
calculate a quality of the principal cell by adding the weighted respective primary quality measure of the principal cell with the weighted respective secondary quality measure of the principal cell;
calculate a quality of the at least one supplemental cell by adding the weighted respective primary quality measure of the at least one supplemental cell with the weighted respective secondary quality measure of the at least one supplemental cell;
rank the principal cell and the at least one supplemental cell based on the quality of the principal cell and the quality of the at least one supplemental cell; and
select one of the principal cell or the at least one supplemental cell for use based on a result of the ranking.

22. The apparatus of claim 21, wherein the respective primary quality measure and the respective secondary quality measure are independent of each other.

23. The apparatus of claim 21, wherein the selecting includes selecting the cell having a highest calculated quality.

24. The apparatus of claim 21, wherein the weight coefficients are received from a network.

25. The apparatus of claim 21, wherein the principal cell is a servicing cell.

* * * * *